(12) United States Patent
Lu (10) Patent No.: US 7,948,775 B2
(45) Date of Patent: May 24, 2011

(54) DUTY-CYCLE-CONTROLLED HALF-BRIDGE RESONANT CONVERTER

(76) Inventor: Wei-Chun Lu, Shi-Chi (TW)

( * ) Notice: Subject to any disclaimer, the term of this patent is extended or adjusted under 35 U.S.C. 154(b) by 373 days.

(21) Appl. No.: 12/140,115

(22) Filed: Jun. 16, 2008

(65) Prior Publication Data

US 2009/0310387 A1    Dec. 17, 2009

(51) Int. Cl.
*H02M 3/335*    (2006.01)
*H02M 3/24*    (2006.01)

(52) U.S. Cl. .............................. 363/17; 363/98
(58) Field of Classification Search .......... 363/16, 363/17, 21.02, 56.01, 56.02, 97, 98, 131, 363/132
See application file for complete search history.

(56) References Cited

U.S. PATENT DOCUMENTS

| | | | |
|---|---|---|---|
| 6,016,257 A * | 1/2000 | Chang et al. | 363/17 |
| 6,583,999 B1 * | 6/2003 | Spindler et al. | 363/98 |
| 7,158,389 B2 * | 1/2007 | Yasumura | 363/17 |
| 7,688,600 B2 * | 3/2010 | Sauerlander et al. | 363/17 |
| 2007/0291515 A1 * | 12/2007 | Huang | 363/17 |
| 2009/0207635 A1 * | 8/2009 | Elferich | 363/21.03 |

* cited by examiner

*Primary Examiner* — Matthew V Nguyen
(74) *Attorney, Agent, or Firm* — McGinn IP Law Group, PLLC (57) ABSTRACT

A half-bridge resonant converter including a half-bridge switching circuit, a resonant circuit and a rectifier circuit is provided. The half-bridge switching circuit is controlled by two control signals for alternatively coupling two terminals of a DC power source to an input of a resonant circuit. The control signals have the same frequency and duty cycle, and one of the control signals is delayed a period by the other one, in which the frequency of the control signals is constant and the duty cycle of the control signals is variable according to a load. The rectifier circuit generates an output voltage across the load from an output of the resonant circuit. Therefore, the resonant converter of the present invention has the advantage of constant frequency operating and at least one of the two switches operated in ZVS.

6 Claims, 8 Drawing Sheets

Full load

Light load

FIG.5

Full load

Light load

Full load

Light load

FIG.8

DUTY-CYCLE-CONTROLLED HALF-BRIDGE RESONANT CONVERTER

BACKGROUND OF THE INVENTION

1. Field of the Invention

The present invention relates to power converters, and more particularly to half-bridge resonant converters.

2. Description of the Related Art

In recent years, miniaturization and power saving have become important issues in electronic equipments, especially in portable electronic equipments, and hence power converters used in electronic equipments are required to reduce the size and weight and increase the power conversion efficiency. This is achieved by using switching-mode power converters with semiconductor power switches. In reducing power converter size, designers have turned to increased switching frequencies. Higher switching frequencies allow for smaller, lighter inductive/capacitive energy storage and filter components, but also bring with them increased switching losses.

Switching losses include the power loss which results from the simultaneous presence of voltage and current in the semiconductor switch during turn-on and turn-off transitions. The semiconductor switch, for example, may be implemented by metal-oxide-semiconductor field-effect transistor (MOSFET). In addition, switching losses further include the power loss which results from the charging and discharging of the parasitic capacitance across the drain and source of the MOSFET switch. As the switching frequency increases, so do the switching losses. Excessive switching losses can result in damage to the switch and poor power conversion efficiency.

In order to reduce switching losses, resonant concepts are applied to switching power converters to allow zero-voltage switching (ZVS) and/or zero-current switching (ZCS) so as to minimize switching losses. All resonant converters operate in essentially the same way: a square pulse of voltage or current is generated by the power switches and this is applied to a resonant circuit. Energy circulates in the resonant circuit and some or all of it is then tapped off to supply the output.

Figure 1:
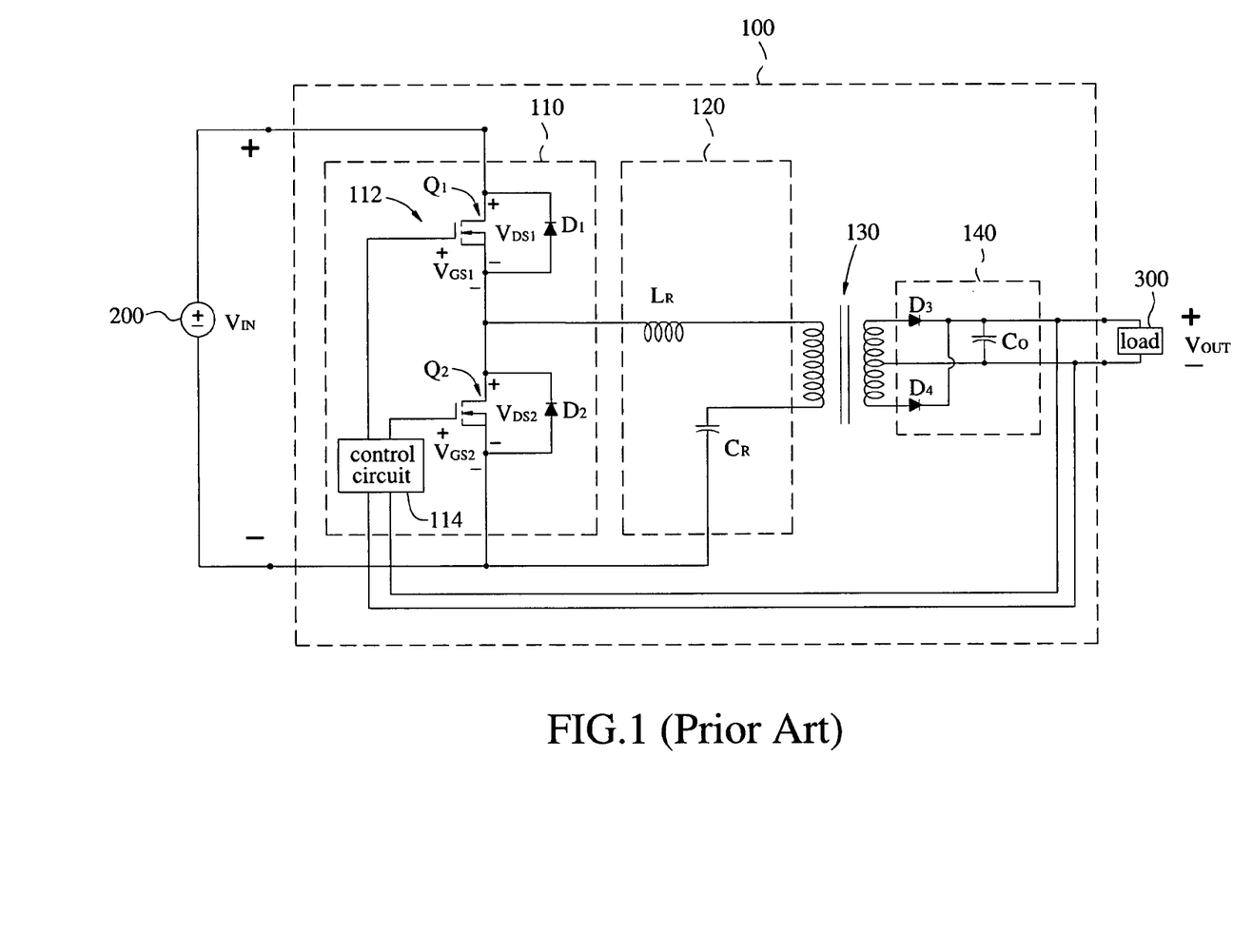
FIG. 1 is a schematic diagram of a conventional half-bridge series resonant converter.

Referring to FIG. 1, it is a schematic diagram of a conventional half-bridge series resonant converter 100. Power provided by a DC power source 200 is delivered to the resonant converter 100 at an input voltage $V_{IN}$ and is delivered to a load 300 at an output voltage $V_{OUT}$. The resonant converter 100 includes a half-bridge switching circuit 110 for alternatively coupling two terminals of the DC power source 200 to an input of a resonant circuit 120. The resonant circuit 120 includes resonant inductor $L_R$ and resonant capacitor $C_R$ coupled in series. In general, the resonant inductance $L_R$ may comprise, in whole or in part, the leakage inductance of the transformer 130. The rectifier circuit 140 includes diodes $D_3$, $D_4$ and an output capacitor $C_O$ to generate the output voltage $V_{OUT}$ from an output of the resonant circuit 120.

In FIG. 1, the switching circuit 110 includes a half-bridge circuit 112 with two switches $Q_1$, $Q_2$ controlled by a control circuit 114. The switches $Q_1$, $Q_2$ are implemented by MOSFET. As switching current reversal is required, all switches must have freewheeling diodes. In the switching circuit 110, the switches $Q_1$, $Q_2$ employ external freewheeling diodes $D_1$, $D_2$. The control circuit 114 provides 50% duty cycle symmetrical control signals, which are identical to each other with 180-degree phase shift, to drive the switches $Q_1$, $Q_2$ in a substantially complementary fashion such that the two terminals of the DC power source 200 are alternatively coupled to the input of the resonant circuit 120. In practice, a short dead time should be set up to avoid the simultaneous conduction (or turn-on) of the two switches; hence, the duty cycle of the two control signals is not 50% but generally close to 50%. During the dead time, both of the switches $Q_1$, $Q_2$ are turned off.

Figure 2:
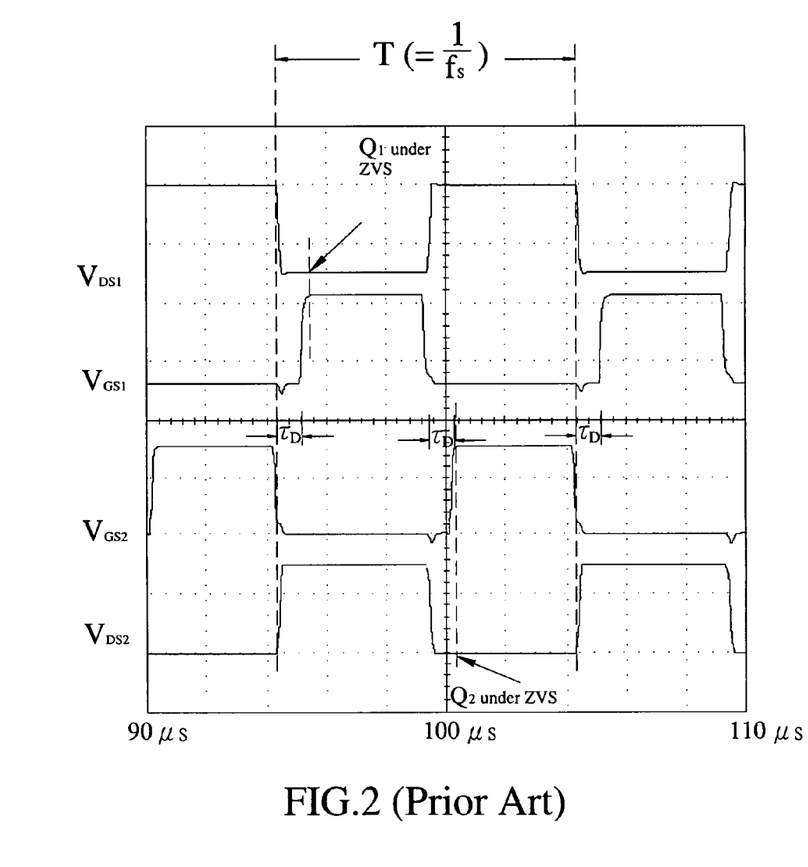
FIG. 2 is a timing diagram of control signals of switches and voltage across the switches in the resonant converter of FIG. 1.

Referring to FIG. 2, it is a timing diagram of the control signals of the switches $Q_1$, $Q_2$ and voltages across the switches $Q_1$, $Q_2$ in the resonant converter 100 of FIG. 1 for full load or light load. In the present embodiment, the control signals are two gate-to-source voltages $V_{GS1}$, $V_{GS2}$, and the voltages across the switches $Q_1$, $Q_2$ are two drain-to-source voltages $V_{DS1}$, $V_{DS2}$. Here, the dead time $\tau_D$ is exaggerated for display. It is obvious that the switch $Q_1$ is turned on when the voltage $V_{DS1}$ across the switch $Q_1$ is zero, and the switch $Q_2$ is turned on when the voltage $V_{DS2}$ across the switch $Q_2$ is zero. In other words, both switches $Q_1$, $Q_2$ are operated under ZVS so as to minimize switching losses. In such resonant converter 100, as the load 300 is changed, the output voltage $V_{OUT}$ (or output power) muse be regulated by controlling the switching frequency $f_S$ (or the reciprocal of the switching period T).

Figure 3:
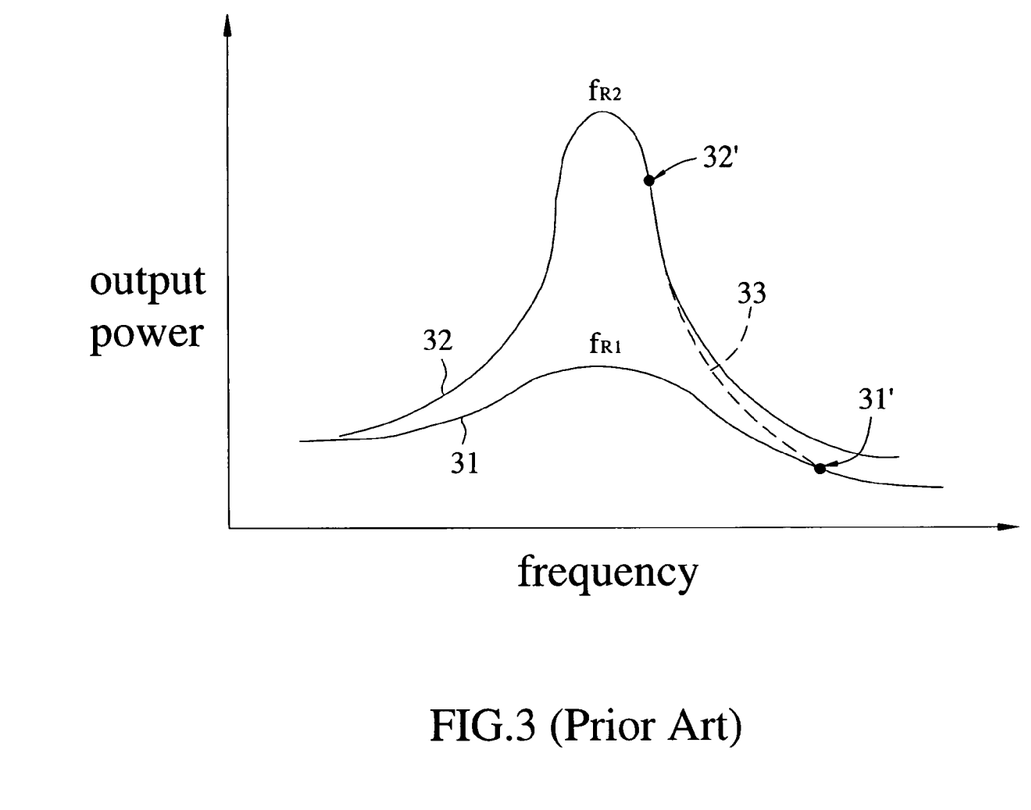
FIG. 3 is a diagram of transfer function of output power of the resonant converter of FIG. 1.

Referring to FIG. 3, it is a diagram of output power v.s. frequency of the resonant converter 100 of FIG. 1. Under a light load (see curve 31), the resonant converter 100 operates at the operating point 31' whose frequency is above and further away from the resonant frequency $f_{R1}$. When the load becomes heavy (see curve 32), the resonant converter 100 must provide more output power to drive the load, hence it operates at the operating point 32' whose frequency is above and closer to the resonant frequency $f_{R2}$. The dashed curve 33 is the locus of operating points. It is shown that the switching frequency (or frequency of operating point) is changed as load is changed. The characteristic of variable (switching) frequency operating has the disadvantage of making the control and the electromagnetic interference (EMI) filter design more complicated.

SUMMARY OF THE INVENTION

Accordingly, it is an object of the present invention to provide a half-bridge resonant converter with a constant (switching) frequency operating and low switching losses.

Another object of the present invention is to provide a half-bridge resonant converter with a near-constant (switching) frequency operating and low switching losses.

In accordance with the present invention, a half-bridge resonant converter including a half-bridge switching circuit, a resonant circuit, a rectifier circuit and a control circuit is provided. Power provided by a DC power source is delivered to the resonant converter at an input voltage and is delivered to a load at an output voltage. The half-bridge switching circuit is coupled to the resonant circuit, and the resonant circuit is coupled to the rectifier circuit. The half-bridge switching circuit includes two switches which are controlled by two corresponding control signals for alternatively coupling two terminals of the DC power source to an input of the resonant circuit. The control signals have the same frequency and duty cycle, and one of the control signals is delayed a period by the other one, in which the period prevents simultaneous conduction of the switches. The frequency of the control signals is constant and the duty cycle of the control signals is variable according to the load, in which the duty cycle is less than or equal to 50%. The resonant circuit includes a resonant inductance and a capacitance. The rectifier circuit generates the output voltage from an output of the resonant circuit. The control circuit coupled to the two switches and the output voltage across the load generates the two control signals.

In accordance with the present invention, a half-bridge resonant converter including a half-bridge switching circuit, a resonant circuit, a rectifier circuit, a valley detector and a control circuit is provided. The valley detector is coupled to one of the two switches, in which the one of the two switches isn't operated under zero voltage switching. The control circuit is coupled to the valley detector, the two switches and the output voltage across the load. The valley detector detects a relatively minimum of a voltage across the one of the two switches and sends a signal representing the detection of the relatively minimum. The control circuit generates the two control signals. By the two control signals, the control circuit delays the turn-ons of the two switches until the control circuit receives the signal representing the detection of the relatively minimum.

Therefore, the half-bridge resonant converter of the present invention has the advantage of constant or near-constant frequency operating and at least one of the two switches operated in ZVS. The constant or near-constant frequency operating makes the control and the EMI filter design simpler. At least one of the two switches operated in ZVS makes switching losses acceptable.

BRIEF DESCRIPTION OF THE DRAWINGS

The foregoing and other features of the disclosure will be apparent and easily understood from a further reading of the specification, claims and by reference to the accompanying drawings in which like reference numbers refer to like elements and wherein:

DETAILED DESCRIPTION OF THE INVENTION

The present invention will now be described more fully with reference to the accompanying drawings, in which exemplary embodiments of the invention are shown. These embodiments are provided so that this application will be thorough and complete. It will be understood that when an element is referred to as being "connected" or "coupled" to another element, it can be directly connected or coupled to the other element or intervening elements may be present.

Figure 4:
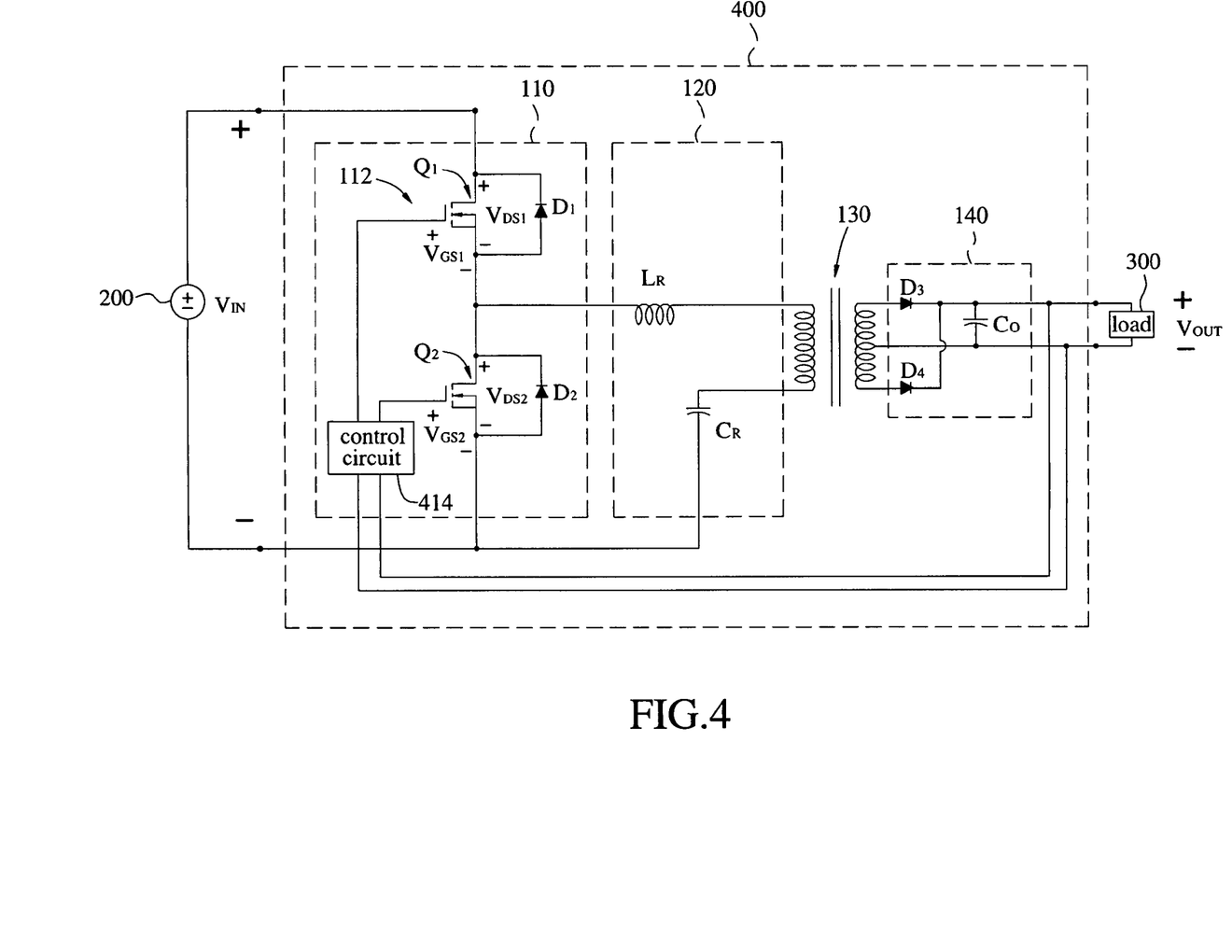
FIG. 4 is a schematic diagram of a resonant converter in accordance with one embodiment of the present invention.

FIG. 4 is a schematic diagram of a resonant converter in accordance with one embodiment of the present invention. Referring to FIGS. 1 and 4, the circuit topology of the resonant converter 400 is similar to the resonant converter 100 of FIG. 1. The only difference between the resonant converters 100 and 400 is the control signals applied to the switches $Q_1$, $Q_2$ of the half-bridge switching circuit 110. The control circuit 114 of FIG. 1 provides two (symmetrical) control signals with the same frequency which is variable and the same duty cycle which is constant and equal to 50%, as a result both switches $Q_1$, $Q_2$ are operated under ZVS but the resonant converters 100 is operated at a variable frequency according to the load 300.

Figure 5:
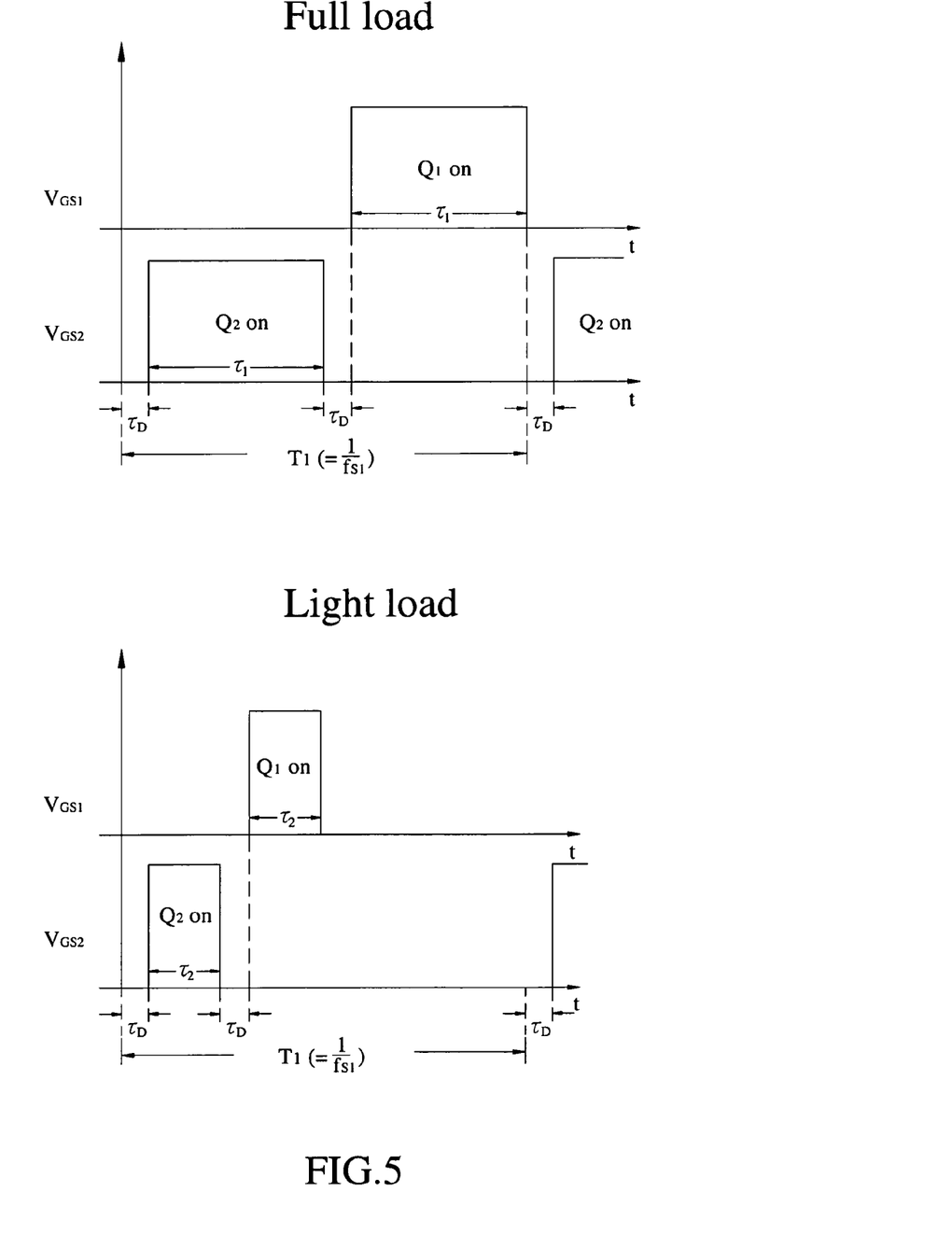
FIG. 5 is a timing diagram of control signals of switches in the resonant converter of FIG. 4.

Instead, the control circuit 414 of FIG. 4 provides two control signals with the same frequency which is constant and the same duty cycle which is variable. Referring to FIG. 5, it is a timing diagram of the control signals $V_{GS1}$, $V_{GS2}$ of the switches $Q_1$, $Q_2$ in the resonant converter 400 of FIG. 4. Under full load condition, the control signals $V_{GS1}$, $V_{GS2}$ have the same frequency $f_{S1}$ ($=1/T_1$) and the same duty cycle $d_1$ ($=\tau_1/T_1$), and one of the control signals is delayed a period by the other one, for example, the control signal $V_{GS1}$ is delayed the period $\tau_D$ by the control signal $V_{GS2}$. Under light load condition, the control signals $V_{GS1}$, $V_{GS2}$ have the same frequency $f_{S1}$ ($=1/T_1$) and the same duty cycle $d_2$ ($=\tau_2/T_1$), and one of the control signals is delayed a period by the other one, for example, the control signal $V_{GS1}$ is delayed the period $\tau_D$ by the control signal $V_{GS2}$. Note that the frequency is constant and the duty cycle is variable according to the load. In the present embodiment, the frequency is always fixed at $f_{S1}$. The duty cycle is $\tau_1/T_1$ under full load or $\tau_2/T_1$ under light load.

Figure 6:
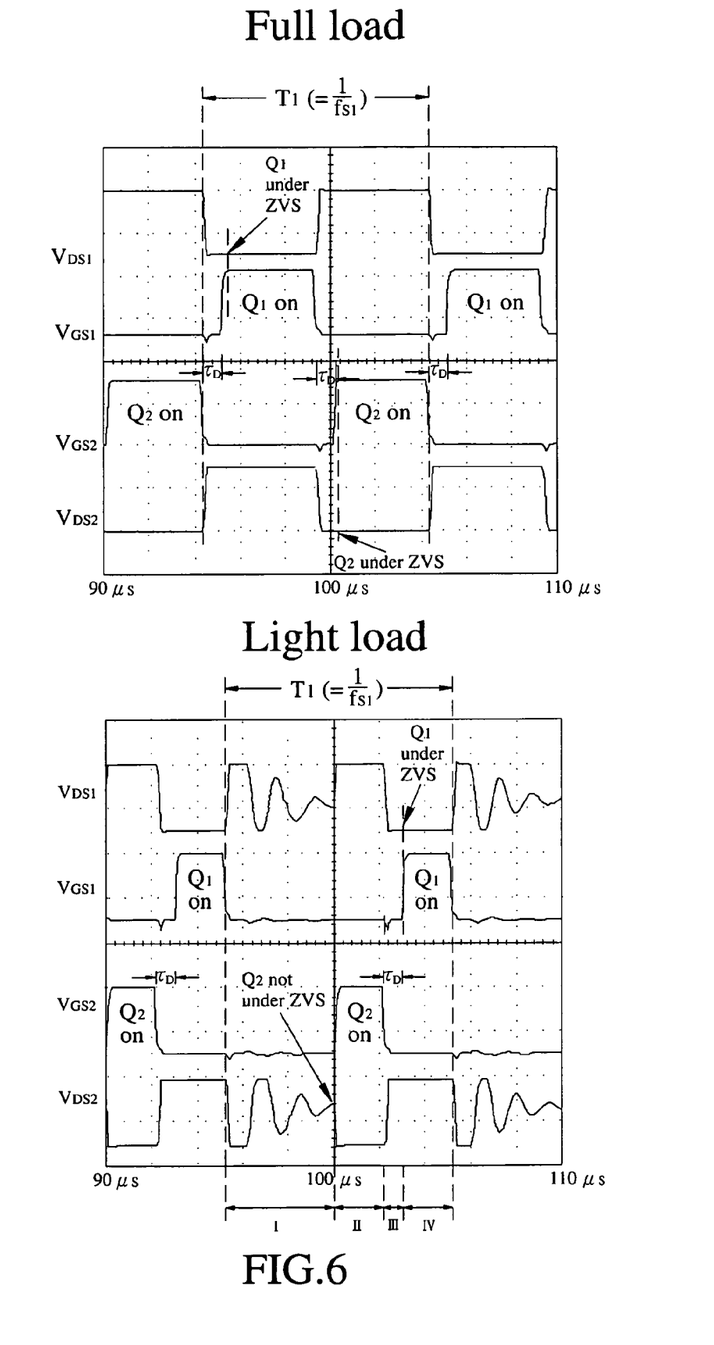
FIG. 6 is a timing diagram of simulation of control signals of switches and voltage across the switches in the resonant converter of FIG. 4.

Referring to FIG. 6, it is a timing diagram of simulation of the control signals $V_{GS1}$, $V_{GS2}$ of the switches $Q_1$, $Q_2$ and the voltages $V_{DS1}$, $V_{DS2}$ across the switches $Q_1$, $Q_2$ in the resonant converter 400 of FIG. 4. Under full load condition, the switch $Q_1$ is turned on when the voltage $V_{DS1}$ across the switch $Q_1$ is zero, and the switch $Q_2$ is turned on when the voltage $V_{DS2}$ across the switch $Q_2$ is zero. Both switches $Q_1$, $Q_2$ are operated under ZVS so as to minimize switching losses. It is similar to the timing diagram of the conventional resonant converter 100 as shown in FIG. 2. Under light load condition, the switch $Q_1$ is turned on when the voltage $V_{DS1}$ across the switch $Q_1$ is zero, but the switch $Q_2$ is turned on when the voltage $V_{DS2}$ across the switch $Q_2$ is not zero, wherein the voltage $V_{DS2}$ across the switch $Q_2$ is about $V_{IN}/2$ because the switches $Q_1$, $Q_2$ have the same duty cycle. Even through the switch $Q_2$ isn't operated under ZVS, the switching loss resulted from the switch $Q_2$ is small because the voltage $V_{DS2}$ across the switch $Q_2$ is small (about $V_{IN}/2$) when the switch $Q_2$ is turned on.

In the resonant converter 400 of the present invention, the switching frequency $f_{S1}$ is constant no matter how load is changed. As the load 300 is changed, the duty cycle of the control signals $V_{GS1}$, $V_{GS2}$ of the switches $Q_1$, $Q_2$ is changed to regulate the output voltage $V_{OUT}$ to match the load 300. The characteristic of constant (switching) frequency operating has the advantage of making the control and the electromagnetic interference (EMI) filter design simpler. The price is the low switching loss because one of the switches $Q_1$, $Q_2$ isn't operated under ZVS when the load is under light load condition, for example, $Q_2$ isn't operated under ZVS as shown in FIG. 6. The switching loss resulted from the switch $Q_2$ is small because the voltage $V_{DS2}$ across the switch $Q_2$ is small (about $V_{IN}/2$). Therefore, the total switching losses of the resonant converter 400 of the present invention are small and acceptable.

Referring again to FIG. 6, there are four stages I-IV during the switching period $T_1$. During the stage I, the switches $Q_1$, $Q_2$ are turned off, and the duration of the stage I is long enough for the resonant inductor $L_R$ and the resonant capacitor $C_R$ to generate signal oscillation of the voltages $V_{DS1}$, $V_{DS2}$. The signal oscillation damps as the energy is almost transferred to the rectifier circuit 140 through the transformer 130. When the signal oscillation of the voltage $V_{DS2}$ damps approximately to $V_{IN}/2$, the switch $Q_2$ is turned on so that the switch $Q_2$ is not operated under ZVS. The switching loss resulted from the switch $Q_2$ is small because the voltage $V_{DS2}$ across the switch $Q_2$ is small (about $V_{IN}/2$). However, it may happen that the switch $Q_2$ is turned on at a relatively maximum of the voltage $V_{DS2}$ when the signal oscillation of the voltage $V_{DS2}$ damps approximately to $V_{IN}/2$, as illustrated in FIG. 6. In order to further reduce the switching loss resulted from the switch $Q_2$, a valley detector is employed in the resonant converter 400.

Figure 7:
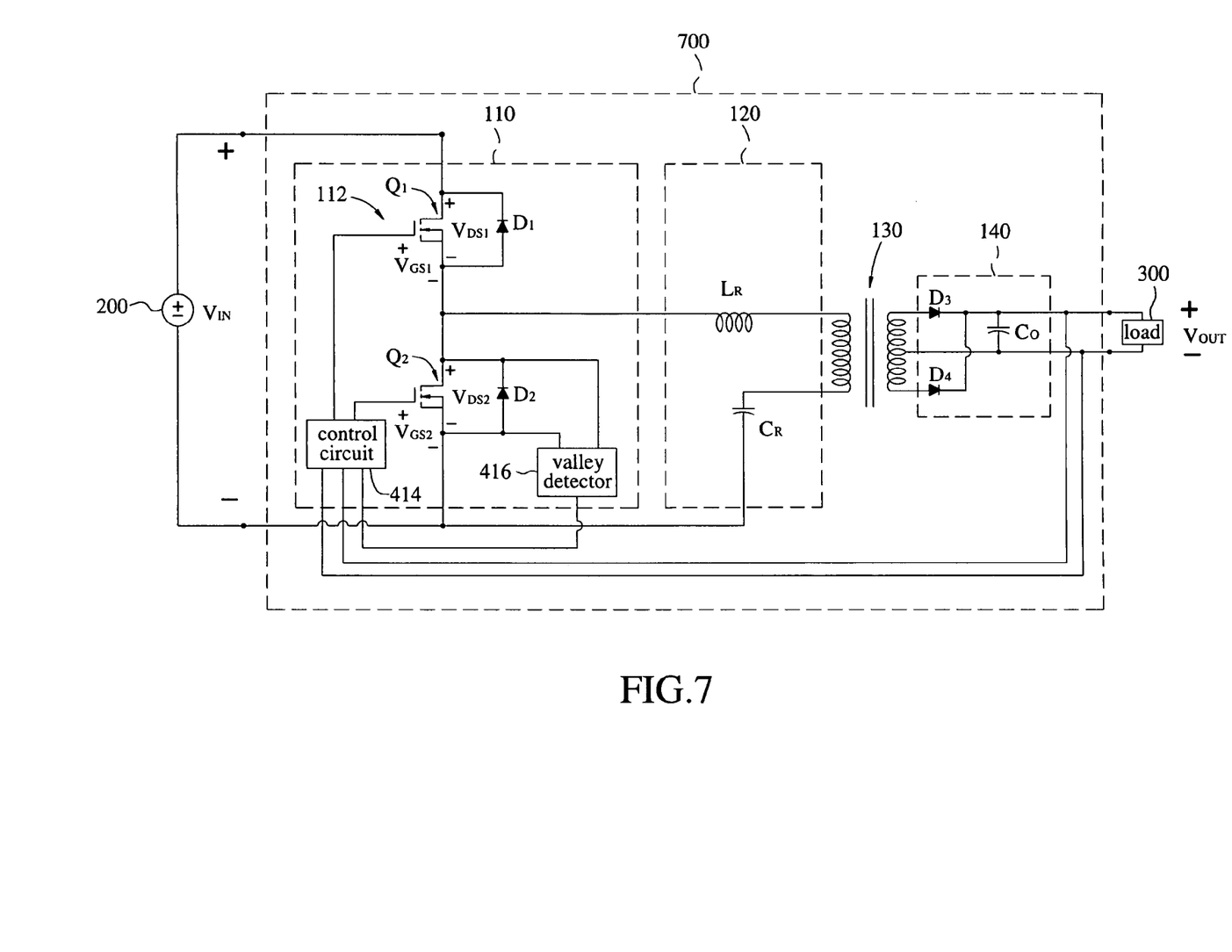
FIG. 7 is a schematic diagram of a resonant converter in accordance with another embodiment of the present invention.
Figure 8:
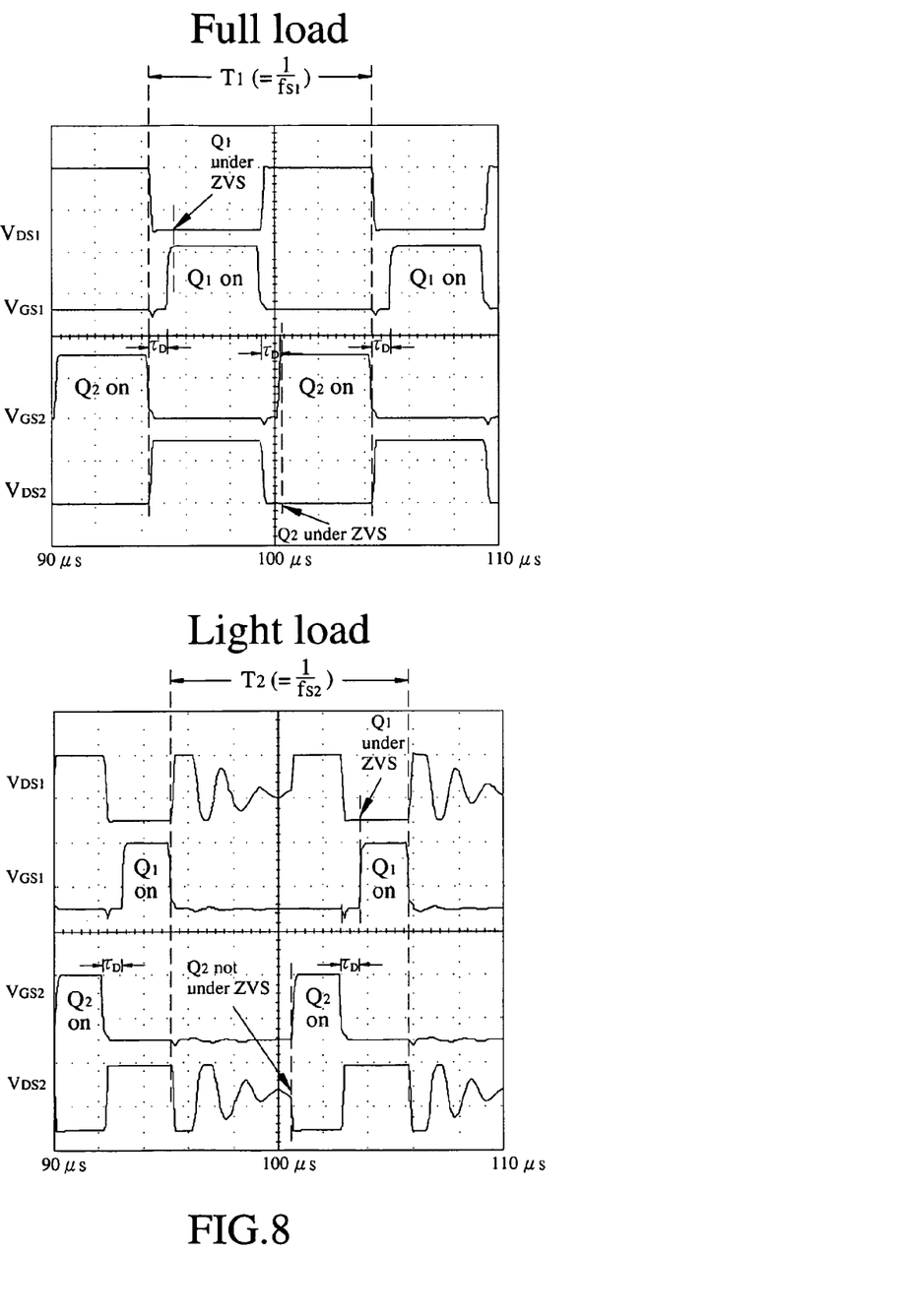
FIG. 8 is a timing diagram of simulation of control signals of switches and voltage across the switches in the resonant converter of FIG. 7.

Referring to FIG. 7, a valley detector 416 is employed in the resonant converter 400 to constitute the resonant converter 700. The inputs of the valley detector 416 are coupled to two terminal of the switch $Q_2$ to detect a relatively minimum of the voltage $V_{DS2}$ when the signal oscillation of the voltage $V_{DS2}$ damps approximately to $V_{IN}/2$. The output of the valley detector 416 is coupled to the control circuit 414 to send a signal representing the detection of the relatively minimum of the voltage $V_{DS2}$ when the signal oscillation of the voltage $V_{DS2}$ damps approximately to $V_{IN}/2$. The control circuit 414 delays the turn-ons of the switches $Q_1$, $Q_2$ until it receives the signal sent from the valley detector 416, as illustrated in FIG. 8. Referring to FIG. 8, the switching period will change slightly because of the delay of the turn-ons of the switches. For example, the switching period changes from $T_1$ to $T_2$ when the load becomes light. Note that the switching period $T_2$ is close to the switching period $T_1$, so the resonant converter 700 has a "near-constant" (switching) frequency operating. The resonant converter 700 guarantees that the switch $Q_2$ is turned on at a relatively minimum of the voltage $V_{DS2}$ when the signal oscillation of the voltage $V_{DS2}$ damps approximately to $V_{IN}/2$, so as to further reduce the switching loss resulted from the switch $Q_2$.

In summary, the present invention employs two control signals having the same constant or near-constant frequency and the same variable duty cycle, and one of the control signals is delayed a period by the other one, to drive the switches of the half-bridge switching circuit of the resonant converter. Therefore, the resonant converter of the present invention has the advantage of constant or near-constant frequency operating and at least one of the two switches operated in ZVS. The constant or near-constant frequency operating makes the control and the EMI filter design simpler. At least one of the two switches operated in ZVS makes switching losses acceptable.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A half-bridge resonant converter, adapted to deliver power from a DC power source to a load, comprising:
   a resonant circuit including a resonant inductance and a capacitance;
   a half-bridge switching circuit coupled to the resonant circuit, including two switches controlled by two corresponding control signals, for alternatively coupling two terminals of the DC power source to an input of the resonant circuit;
   a rectifier circuit coupled to the resonant circuit for generating an output voltage across the load from an output of the resonant circuit; and
   a control circuit coupled to the two switches and the output voltage across the load for generating the two control signals,
   wherein the control signals have the same frequency which is constant and the same duty cycle which is variable according to the load, and one of the control signals is delayed a period by the other one, the period preventing simultaneous conduction of the switches, wherein the duty cycle is less than or equal to 50%.

2. The half-bridge resonant converter according to claim 1, further comprising:
   a transformer coupled between the resonant circuit and the rectifier circuit for providing isolation of inner and outer power supplies.

3. A half-bridge resonant converter, adapted to deliver power from a DC power source to a load, comprising:
   a resonant circuit including a resonant inductance and a capacitance;
   a half-bridge switching circuit coupled to the resonant circuit, including two switches controlled by two corresponding control signals, for alternatively coupling two terminals of the DC power source to an input of the resonant circuit;
   a rectifier circuit coupled to the resonant circuit for generating an output voltage across the load from an output of the resonant circuit;
   a valley detector coupled to one of the two switches for detecting a relatively minimum of a voltage across the one of the two switches and sending a signal representing the detection of the relatively minimum, wherein the one of the two switches isn't operated under zero voltage switching; and
   a control circuit coupled to the valley detector, the two switches and the output voltage across the load, for generating the two control signals, wherein the two control signals delay the turn-ons of the two switches until the control circuit receives the signal representing the detection of the relatively minimum,
   wherein the control signals have the same frequency which is constant and the same duty cycle which is variable according to the load, and one of the control signals is delayed a period by the other one, the period preventing simultaneous conduction of the switches, wherein the duty cycle is less than or equal to 50%.

4. The half-bridge resonant converter according to claim 3, further comprising:
   a transformer coupled between the resonant circuit and the rectifier circuit for providing isolation of inner and outer power supplies.

5. The half-bridge resonant converter according to claim 1, wherein under a full load condition, the two switches are operated in zero-voltage switching (ZVS); and, under a light load condition, one of the two switches is operated in ZVS and the other of the two switches is not operated in ZVS.

6. A half-bridge switching circuit for a half-bridge resonant converter which includes a resonant circuit and a rectifier circuit coupled to the resonant circuit and is adapted to deliver power from a DC power source to a load, the half-bridge switching circuit comprising:
   two switches which are controlled by two corresponding control signals, and alternately couple two terminals of the DC power source to an input of the resonant circuit; and
   a control circuit which is coupled to the two switches and an output voltage across the load generated by the rectifier circuit from an output of the resonant circuit, the control circuit generating the two control signals such that the two control signals have the same frequency which is constant and the same duty cycle which is variable according to the load, and one of the two control signals is delayed a period by the other one, the period preventing simultaneous conduction of the switches, and the duty cycle being less than or equal to 50%.

* * * * *